May 6, 1969 K. R. BANGERTER 3,442,362
TORQUE RELEASE AND SHUT-OFF MECHANISM FOR PNEUMATIC TOOLS
Filed Aug. 31, 1967

INVENTOR
KENNETH R. BANGERTER
BY
David W. Tibbott
ATTORNEY

May 6, 1969 K. R. BANGERTER 3,442,362
TORQUE RELEASE AND SHUT-OFF MECHANISM FOR PNEUMATIC TOOLS
Filed Aug. 31, 1967 Sheet 3 of 3

INVENTOR
KENNETH R. BANGERTER
BY
David W. Tillott
ATTORNEY

United States Patent Office 3,442,362
Patented May 6, 1969

3,442,362
TORQUE RELEASE AND SHUT-OFF MECHANISM FOR PNEUMATIC TOOLS
Kenneth R. Bangerter, Ithaca, N.Y., assignor to Ingersoll-Rand Company, New York, N.Y., a corporation of New Jersey
Filed Aug. 31, 1967, Ser. No. 664,777
Int. Cl. F16p 3/00; F16d 67/00, 71/00
U.S. Cl. 192—150
13 Claims

ABSTRACT OF THE DISCLOSURE

A pneumatic power wrench having a cone clutch with a "locking taper," a torque sensing means and a motor exhaust shut-off valve adapted to close automatically in response to the torque sensing means. The closing of the shut-off valve simultaneously opens the cone clutch to disengage the tool motor from its spindle and to stop the tool motor.

BACKGROUND OF INVENTION

This invention relates to a torque release clutch mechanism which opens a drive connection between a driving member and a driven member when the torque load on said members exceeds a predetermined value or magnitude. The torque release clutch mechanism of this invention is particularly useful in tools which apply torque loads to fasteners, such as power-operated wrenches or screwdrivers.

In driving a screw or other threaded fastener "home," into a holding position, it is highly desirable to use a power-operated tool containing a torque release clutch which automatically releases the torque driving force on the fastener after it is tightened to a selected or predetermined torque load. In order to prevent the tool from "kicking" the operator, the clutch must release the torque load at high speed; otherwise if the clutch releases relatively slowly, the operator receives an undesirable reaction while the clutch is releasing. During the period that the clutch is engaged, the drive from the tool motor to the fastener must be as rigid (non-yielding) as possible for efficient transmission of the torque. On the other hand, once the clutch releases, the release of torque must be complete to prevent the application of an undesirable reaction torque on the operator.

In addition to the above problem, it is desirable that the tool does not cause the clutch to release prematurely during the initial starting and acceleration of the tool motor. This undesirable reaction often occurs in power-operated wrenches using clutches. This reaction is caused by the inertia of the tool drive train opposing the acceleration forces applied by the tool motor to place a momentary load on the clutch high enough to cause it to release.

Another problem found in power wrenches containing clutches is the tendency of the clutch to re-engage after the hand throttle is closed and before the tool motor comes to a stop. This action of the clutch is undesirable because it places high impact loads on the clutch which are likely to damage it. For example, this type of defective operation often results in the clutch teeth being chipped.

It is also desirable to automatically stop the wrench motor when the clutch opens to conserve power and to signal the operator of the end of the wrench operation cycle. Normally, the means for stopping the wrench motor is connetced to the clutch by a mechanical connection which extends axially through the tool motor, which complicates the construction of the mechanical connection, the motor and the wrench casing.

It is also desirable for a torque release clutch to be constructed in a manner whereby it encounters very little or no wear over the normal life of a wrench. Conventional wrenches have jaw clutches which cannot avoid wear during release and reengagement.

SUMMARY OF INVENTION

The principal object of this invention is to provide a torque release clutch mechanism having a relatively simplified and novel construction and which substantially eliminates or minimizes the foregoing problems.

Other important objects of this invention are: to provide a torque release clutch mechanism which releases itself under a selected torque load with the torque release being performed at a high speed and being a complete torque release; to provide a torque release clutch mechanism which can be adjusted to release at a predetermined torque load; to provide a torque release clutch mechanism which rigidly transmits a torque load before it is released and which releases the transmission of torque completely after it opens; to provide a novel torque release clutch mechanism cooperating with a normally open motor valve which automatically releases the clutch mechanism in response to the closing of the motor valve; to provide a torque release clutch and power shut-off mechanism which is relatively simple and does not require a rod extending through the tool motor; to provide a torque release clutch mechanism which exhibits exhibits extremely low rates of wear over the normal life of a power wrench; to provide a tool having a torque releasing clutch which does not prematurely release during the initial acceleration of the tool motor; and to provide a tool having a torque release clutch which does not prematurely re-engage itself after the throttle is closed and before the tool motor stops.

In brief, these objects are attained in a power wrench including a torque sensing means in the tool drive, a shut-off valve in the exhaust passage of the motor adapted to be closed in response to the torque sensing means at a selected torque and a clutch adapted to be simultaneously opened by the closing of the shut-off valve. The clutch is a "cone type" of clutch with a locking taper which opens very fast to avoid wear and to prevent giving the wrench operator a "kick."

BRIEF DESCRIPTION OF DRAWINGS

The invention is described in connection with the accompanying drawings wherein.

DESCRIPTION OF PREFERRED EMBODIMENTS

Figures 1, 2:
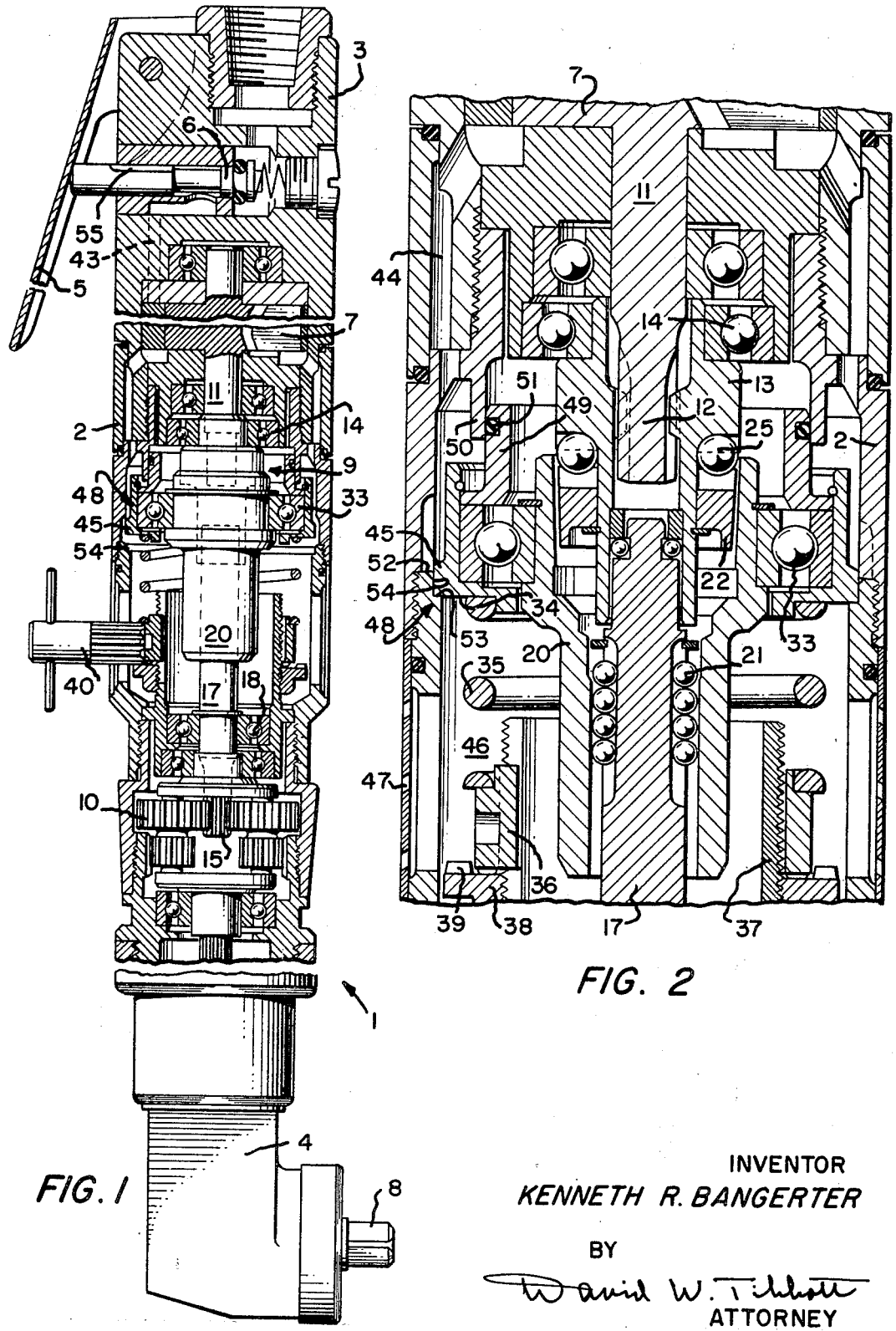
FIG. 1 is an elevational view with portions broken away of a pneumatic angle wrench containing a torque release clutch embodying the concepts of this invention, the clutch being shown in its normally engaged position and the shut-off valve of the tool being shown in its normally open position.
FIG. 2 is a fragmentary section with portions broken away showing the clutch and pneumatic actuator means of FIG. 1 on a larger scale and with the clutch released and the shut-off valve being fully closed.
Figure 3:
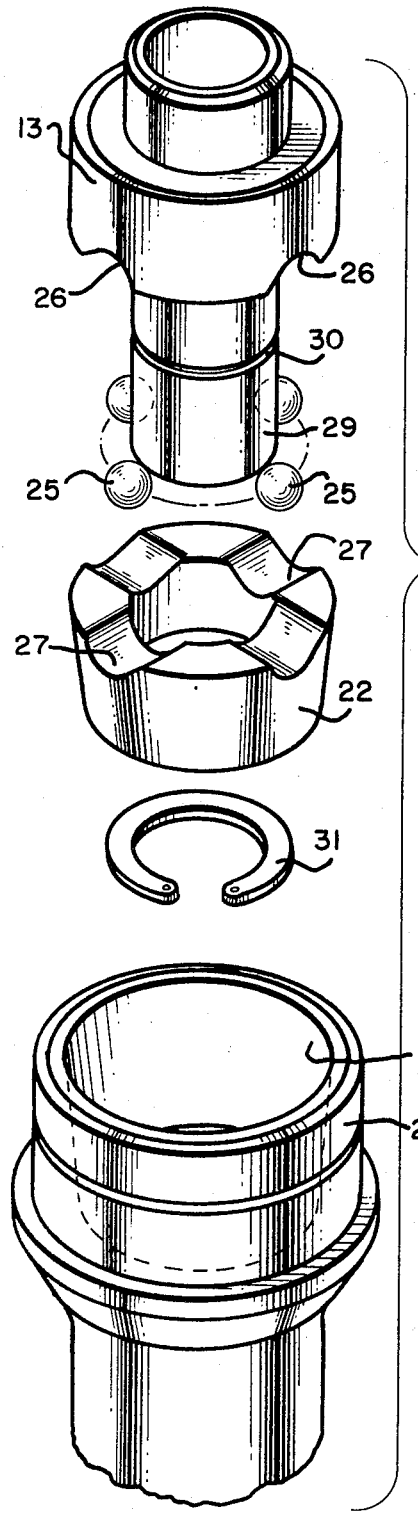
FIG. 3 is an exploded perspective view of the clutch.

The pneumatic-powered angle wrench 1 shown in the drawings includes a casing 2 having a backhead 3 and a front nose 4. The backhead 3 carries a pivoted throttle lever 5 acting on a throttle valve stem 6. The depression of the throttle lever 5 opens the thottle valve 6 to feed pneumatic pressure to a rotary motor 7 contained in the casing 2. The front nose 4 carries a rotary spindle 8 having a square cross section and adapted to be connected to a conventional wrench socket (not shown) for driving nuts or bolts. The motor 7 drives the spindle 8 through a clutch mechanism 9 and a planetary gear train 10. This invention rests in the clutch mechanism 9 and an automatic motor shut-off means.

The motor 7 includes a rotor shaft 11 having a splined forward end 12 and rotatably mounted in a ball bearing 14 moutned in the casing 2. A clutch driver 13 is splined on the front end 12 of the rotor shaft 11.

The planetary gears 10 include a sun gear 15 mounted at the front end of the tool casing 2. The sun gear 15 is driven by an integral main drive shaft 17 which is rotatably mounted near its front end in a bearing 18. A cup-shaped driven clutch plate 20 is slidably keyed on the rear end of the main drive shaft 17 by a series of key balls 21. A cone-shaped driving clutch plate 22 is rotatably mounted on the clutch driver 13 and is engaged in the cup-shaped clutch plate 20. The angle of the cone-shaped clutch plate 22 and the cone-shaped cavity 23 in the clutch plate 20 is 8 degrees or less relative to the axis of the clutch plates in order to provide the two cone surfaces with a "locking taper." By locking taper, it is meant that the two surfaces are automatically locked together when engaged and have to be pulled apart to be disengaged.

The clutch driver 13 and the cone-shaped clutch plate 22 are interconnected by a set of cam balls 25 which engage corresponding cam notches 26 and 27 provided respectively in the clutch driver 13 and the clutch plate 22. The cam balls 25 transmit torque from the clutch driver 13 to the clutch plate 22 and cooperate with the cam notches 26 and 27 to urge the two clutch elements apart under a torque load. The clutch driver 13, the clutch plate 22, and the cam balls 25 cooperate to form means for sensing and measuring the torque applied by the motor 7 to the clutch clutch plate 22.

The clutch driver 13 has a forward hollow stem 29 which rotatably carries the clutch plate 22 and rotatably receives the rear end of the main drive shaft 17. The stem 29 is provided with an annular groove 30 which receives a snap ring 31 that serves as an abutment means to limit the amount or distance that the cam balls 25 can force the clutch plate 22 and clutch driver 13 apart. The snap ring 31 is positioned so that the clutch plate 22 is continuously keyed to the clutch driver 13; these two elements are prevented from becoming completely disengaged.

The front clutch plate 20 is rotatably connected by a bearing 33 to a spring plate 34. A spring 35 seats against the spring plate 34 and urges the two clutch plates 20 and 22 rearwardly against the clutch driver 13. The forward end of the spring 35 engages an annular spring seat 36 which is slidably mounted and keyed on a tube 37 mounted in the casing 2. The spring seat 36 abuts a nut 38 threaded on the tube 37. The nut 38 carries gear teeth 39 for cooperating with a "Jacobs" type chuck key 40 for turning the nut 38 and, thus, adjusting the load on the spring 35. The chuck key 40 is removed from the position shown in FIG. 1 after the spring adjustment is complete. This type of adjustment mechanism is conventional as shown in U.S. Patents 3,263,785 and 3,288,258.

The tool motor 7 receives inlet pressure fluid from the throttle valve 6 through the inlet passage 43. The motor 7 is exhausted through an exhaust passage 44 extending forwardly in the tool casing past a normally-open shut-off valve 45 into a chamber 46 which contains the spring 35. The chamber 46 is exhausted to atmosphere through numerous ports 47 provided in the tool casing 2 surrounding the chamber 46.

The shut-off valve 45 is formed integrally with the spring plate 34 and is adapted to seat in an annular valve seat 48 formed in the interior of the casing 2 and surrounding the valve 45.

The valve 45 carries an annular tailpiece 49 on its rear end. The tailpiece 49 slidably engages a forward projecting annular flange 50 with an O-ring seal 51 mounted on the tailpiece 49 for blocking air pressure from leaking through the clutch parts.

The valve seat 48 includes a rear shoulder 52, a front shoulder 53 and an interconnecting bore 54. When the shut-off valve 45 moves forwardly, it initially moves past the rear shoulder 52, whereby the exhaust passage 44 is completely sealed. Thereafter, the valve 45 can move along the interconnecting bore 54, like a piston in a cylinder, until its front end seats against the front shoulder 53. The additional "piston type" movement of the valve 45 after it closes the exhaust passage is provided to allow it to develop a full differential pressure across it for opening the clutch plates 20 and 22.

Figure 5:
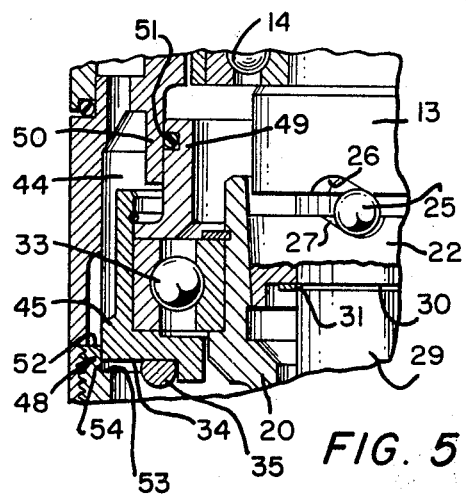
FIG. 5 is a view similar to FIG. 4 with the torque sensing portion of the clutch being shown in a loaded condition and with the shut-off valve being in an intermediate position.

The rear shoulder 52 of the valve seat 48 is located where the valve 45 will initially close the valve seat 48 immediately before the clutch plate 22 is pushed away from the clutch driver 13 to its full extent, as shown in FIG. 5. In this position, the valve 45 has completely closed the exhaust to stop the motor 7 and to create a high pressure differential across the valve 45. With the creation of this high pressure differential, the valve 45 is forced further forward along the bore 54, as a piston, to open the clutch by pulling the clutch plate 20 off of the clutch plate 22 after the clutch plate 22 abuts snap ring 31, which prevents further forward travel of the clutch plate 22. The release of the clutch is very fast due to the "locking taper" of the clutch plates 20 and 22. In effect, the valve 45 is a clutch operating means for opening or releasing the clutch.

OPERATION

When the wrench 1 is at rest, the clutch plates 20 and 22 are engaged, the shut-off valve 45 is open and the throttle valve 6 is closed. The value of torque under which the wrench will shut off is set by adjusting the load on the spring 35. This is performed using the chuck key 40 to turn the nut 38. After the wrench 1 is adjusted, the chuck key 40 is removed and set aside until it may be necessary to change the shut-off torque of the wrench.

Assuming that the wrench 1 is connected to an air pressure line and a selected wrench socket is placed on the spindle 8, the operator places the socket over the fastener and presses the throttle lever 5 to open the throttle valve 6 and feed air pressure to the tool motor 7. As the tool motor 7 rotates, it drives the spindle 8 through the clutch driver 13, the clutch plates 20 and 22, the main drive shaft 17 and the planetary gearing 10.

The torque load on the wrench passes through the cam balls 25 which interact with the cam notches 26 and 27 to urge the clutch plate 22 away from the clutch driver 13. The camming force created by the cam balls is resisted by the spring 35. Consequenlty, the load on the spring 35 will determine the torque value under which the cam balls 25 will move the clutch plate 22 apart from the clutch driver 13 sufficiently for the shut-off valve 45 to throttle the motor exhaust. As the motor exhaust is throttled by the shut-off valve 45, a differential pressure builds up across the valve 45 to urge it forward toward the valve seat 48.

With the creation of the differential pressure, the valve 45 will quickly move to the position shown in FIG. 5 wherein the valve has blocked the motor exhaust and is subject to full pressure from the exhaust passage 44, with the motor exhaust blocked, the motor 7 is shut off.

At this time, the clutch plates 20 and 22 are still locked together by their interengaged "locking taper" surfaces. With full pressure acting on the valve 45, it quickly moves forward in the bore 54 to "break" the clutch plates 20 and 22 apart. Due to the higher force needed to "break" the connection between the clutch plates 20 and 22, once thye separate, they open extremely fast. This opening of the clutch plates occurs substantially simultaneously with the shutting off of the motor 7.

The opening of the clutch plates 20 and 22 is so fast that "kick" of the wrench on the operator is substantially eliminated. Conventional wrenches "kick" an operator when a fastener is driven tight, due to their clutches opening too slowly. In addition, the clutch opens at such high speed that wear on the clutch parts is substantially eliminated.

Stopping the tool motor by shutting its exhaust passage stops it quickly and prevents it from "free wheeling", due to the fact that rotation of the motor after the valve 45 closes creates a "back pressure" which rapidly brakes the motor 7.

After the motor comes to a stop, the operator releases the throttle lever 5, to allow the throttle 6 to close, and lifts the tool from the fastener. Once the throttle valve 6 is closed, the pressure in the motor 7 rapidly leaks down to atmospheric pressure due to normal leakage. In addition, the throttle valve stem 6 can be provided with a leak-down groove 55, as shown in FIG. 1, which automatically connects the inlet passage 43 to atmosphere when the throttle valve 6 is closed.

Figure 4:
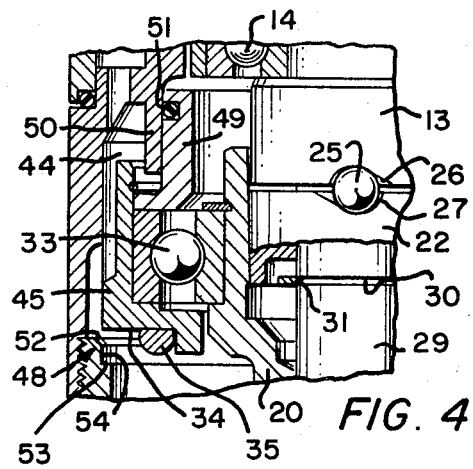
FIG. 4 is a fragmentary longitudinal section with the clutch being shown in elevation in an engaged position.

As the pressure in the motor 7 and acting on the shut-off valve 45 drops, it becomes ineffective to hold the shut-off valve 45 closed against the force of the spring 35. As a result, the valve 45 opens and the clutch plates 20 and 22 are reengaged, as shown in FIGS. 1 and 4. After the clutch plates 20 and 22 are re-engaged, the wrench 1 is ready for another cycle.

Figure 6:
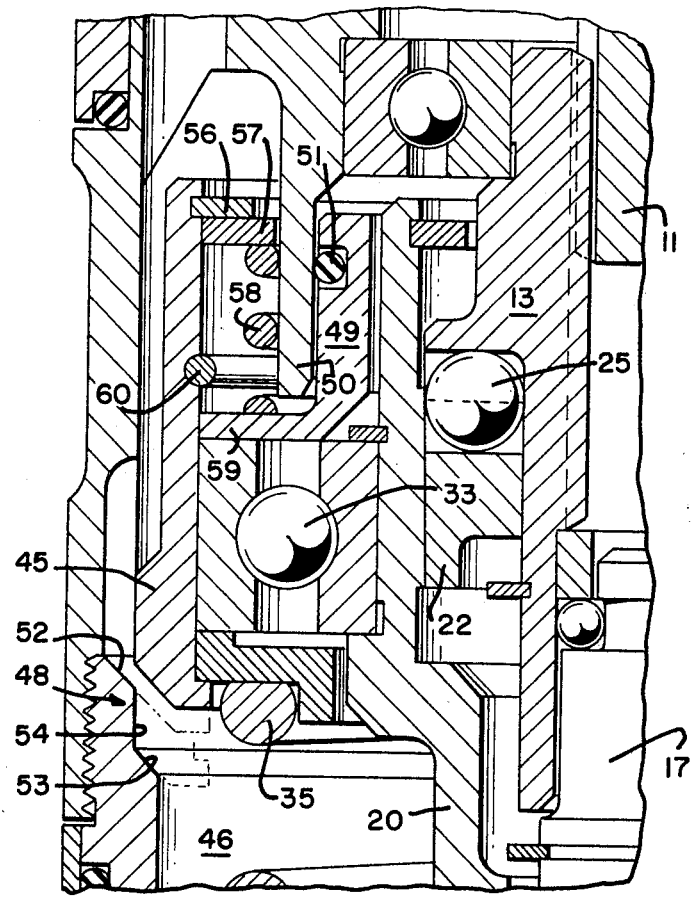
FIG. 6 is a fragmentary section similar to FIG. 2 showing a second embodiment having a shut-off valve that can move relative to the clutch for a limited distance.

*Second embodiment, FIG. 6*

In the second embodiment, the shut-off valve 45 is mounted on the bearing 33 and the tailpiece 49 for a small limited amount of relative slidable movement or "lost motion". A lock ring 56 and washer 57 are mounted in the rear end of the valve 45 and a light spring 58 is interposed between the washer 57 and the front flange 59 of the tailpiece 49. The spring 58 urges the valve 45 rearwardly on the tailpiece 49. The slidable movement of the valve 45 and bearing 33 is limited by a second lock ring 60 mounted inside of the annular shut-off valve 45.

Allowing the valve 45 to move relative to the front clutch plate 20 insures that the valve 45 will quickly close as soon as a small differential pressure develops across it. This "lost motion" allows the differential pressure across the valve 45 to close the valve before it is sufficiently high to open the clutch plates 20 and 22. Once the valve 45 passes the rear shoulder 52 of the valve seat 48, the exhaust passage 44 is closed and the differential pressure across the valve 45 rapidly rises to its maximum extent which will quickly open the two clutch plates 20 and 22.

Figure 8:
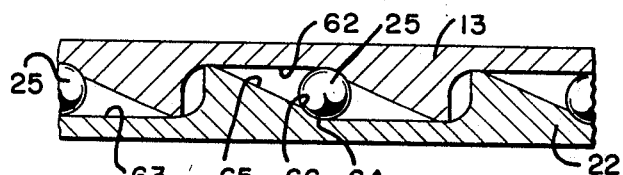
FIG. 8 is a view showing the rotary cam of FIG. 7 in a developed position wherein its circumference is positioned flat.
Figure 7:
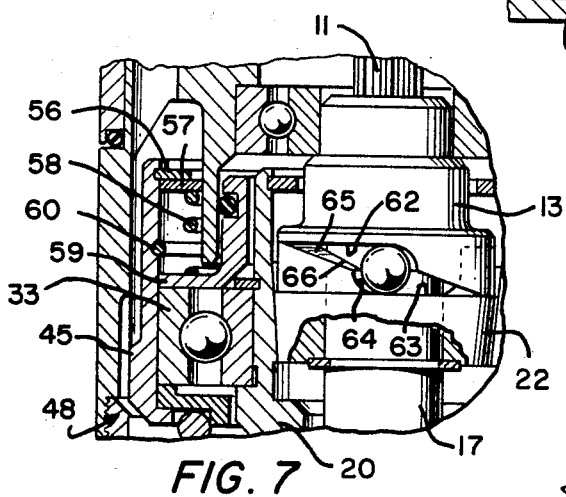
FIG. 7 is a fragmentary section similar to FIG. 4 showing a third embodiment having a modified cam for sensing torque.

*Third embodiment, FIGS. 7 and 8*

The third embodiment shown in FIGS. 7 and 8 was devised to accomplish an aditional function which is similar to that accomplished by the second embodiment. The third embodiment is designed to initially resist the closing of the shut-off valve 45 with a greater force than is offered after the torque sensing means (the clutch plate 22, cam balls 25 and clutch driver 13) has separated a predetermined amount under the application of torque. Thus, once the shut-off valve 45 beings to close and moves in the closing direction a given amount, it can close further under the application of less torque than was needed for it to initially begin closing. This feature is provided to insure that the shut-off valve 45 does not hang in a partially closed position, which might happen if the power of the tool motor drops an undue amount, caused by the throttling of the exhaust, before the shut-off valve 45 is completely closed, i.e., if the motor power drops unduly because of exhaust throttling, it will not be able to provide sufficient torque to completely close the valve 45.

In the third embodiment, each of the cam notches 62 and 63 respectively in the clutch driver 13 and the rear clutch plate 22 provides a dual stepped ramp including an initial cam slope 64 which is relatively steep and a second cam slope 65 which is inclined at a much smaller angle. The two slopes 64 and 65 are connected by a cam knee 66.

In order for the shut-off valve 45 to move forward, the cam ball 25 must climb the initial slope 65 and roll over the knee 66. Once the ball 25 is over the knee 66, it can move up the second slope 65 with a lesser torque applied to the clutch mechanism than is necessary to initially force the balls 25 to climb the initial slope 64.

Another means for insuring that the shut-off valve 45 does not hang in a partially open position is by increasing the slope of the cam notches 26 and 27 in the FIG. 1 embodiment to the extent that the spring 35 can be reduced to a minimum. When the spring 35 is relatively weak, the shut-off valve 45 can be closed by a minimum differential pressure created across the valve 45 by a slight throttling.

Although this application describes several embodiments, it should be recognized that the invention is not limited merely to these embodiments, but contemplates other embodiments and variations which utilize the concepts and teachings of the invention.

I claim:
1. A torque releasing clutch mechanism comprising:
   a pair of clutch elements normally interconnected for torque transmission therebetween and including driving and driven elements adapted to disengage to release said clutch;
   a torque sensing and measuring means separate from said clutch elements and interconnected to said driving clutch element for transmitting and measuring the torque load applied to said driving element, and clutch operating means, separate from said torque sensing and measuring means, operative in response to said torque sensing and measuring means to disengage said clutch elements to discontinue the transmisson of torque therebetween;
   said clutch elements remaining firmly engaged without relative rotation occurring between said clutch elements until said clutch operating means disengages them.
2. A torque-releasing clutch mechanism comprising:
   a driving member;
   a driven member;
   a pair of clutch elements slidably mounted relative to each other and to one of said members, one of said clutch elements being disposed between said one member and the other clutch element; the other clutch element being drivenly connected to the other member;
   resilient means urging said clutch elements and said one member together;
   cam means interengaging said one clutch element to said one member for transmitting torque and operative under a given torque load to force said one clutch element and said driving member relatively apart, against the force of said resilient means;
   abutment means limiting the distance that said cam means can force said one clutch element apart from said one member, said abutment means preventing said one clutch element from being entirely disengaged from said one member so that said one clutch element and said one member are continuously engaged to transmit torque therebetween; and means operative in response to said one clutch element being moved apart from said one member over a predetermined distance to force and disengage said other clutch element from said one clutch element.

3. The clutch mechanism of claim 2 wherein:
said clutch elements are normally locked together by means which requires a greater force to initially release said clutch elements than is needed to separate them after they are initially released.

4. The clutch mechanism of claim 3 wherein:
said clutch elements include a conical surface engaging a corresponding conical bore with both having a "locking taper."

5. A torque-releasing clutch mechanism comprising:
first, second and third clutch elements slidably mounted relative to each other;
resilient means urging said clutch elements together;
cam means interengaging said first and second clutch elements for transmitting torque and operative under a torque load to force said first and second clutch elements relatively apart against the force of said resilient means;
means limiting the distance that said cam means can force said first and second clutch elements apart and preventing said first and second clutch elements from being entirely disengaged; and
means operative in response to said first and second clutch elements being moved apart over a predetermined distance to force and disengage said third clutch element from said second clutch element.

6. A power wrench comprising:
a wrench casing containing a fluid motor;
a driving member connected to said motor;
a driven member;
a pair of clutch elements slidably mounted relative to each other and to one of said members, one of said clutch elements being disposed between said one member and the other clutch element, the other clutch element being drivenly connected to the other member;
resilient means urging said clutch elements and said one member together;
cam means interengaging said one clutch element to said one member for transmitting torque and operative under a given torque load to force said one clutch element and said driving member relatively apart, against the force of said resilient means;
abutment means limiting the distance that said cam means can force said one clutch element apart from one said one member, said abutment means preventing said one clutch element from being entirely disengaged from said one member so that said one clutch element and said one member are continuously engaged to transmit torque therebetween; and normally-open valve means controlling the flow of motive fluid through said motor and operative in response to said one clutch element being moved apart from said one member over a predetermined distance to force and disengage said other clutch element from said one clutch element.

7. The power wrench of claim 6 wherein:
said valve means is operated by a differential pressure in disengaging said clutch elements.

8. The power wrench of claim 7 wherein:
said valve means is located in an exhaust passage connected to said motor.

9. The power wrench of claim 8 wherein:
said clutch elements and said valve means are located forwardly of said motor.

10. The power wrench of claim 8 wherein:
said exhaust passage includes an annular passageway surrounding said clutch elements and enclosed in said casing; and
said valve means includes an annular valve slidably mounted in said passageway for closing said passageway to stop said motor.

11. The power wrench of claim 10 wherein:
said annular valve is connected to said other clutch element to move with it.

12. The power wrench of claim 11 including:
means connecting said annular valve to said other clutch element to allow said valve to move ahead of said other clutch element for a limited distance prior to disengaging said clutch elements.

13. The power wrench of claim 6 wherein:
said cam means includes a stepped cam which requires a greater torque load for the one clutch element to begin separating from the driving member than the torque load needed for the one clutch element to continue separating from the driving member after being moved apart an initial distance.

References Cited

UNITED STATES PATENTS

| 3,205,986 | 9/1965 | Kramer | 192—150 XR |
| 3,237,742 | 3/1966 | Ulbing | 192—150 |
| 3,288,258 | 11/1966 | Taylor | 192—150 |
| 3,298,481 | 1/1967 | Schaedler et al. | 192—150 |

CARLTON R. CROYLE, *Primary Examiner.*

A. D. HERRMANN, *Assistant Examiner.*

U.S. Cl. X.R.

192—34; 91—59; 81—52.4; 173—12